United States Patent [19]

Leeming et al.

[11] 4,298,394
[45] Nov. 3, 1981

[54] ORGANIC GYPSUM SET ACCELERATORS

[75] Inventors: Peter A. Leeming; Dimitrios Mitakidis; Peter F. Woodrow, all of Oakville, Canada

[73] Assignee: BPB Industries Limited, London, England

[21] Appl. No.: 52,754

[22] Filed: Jun. 28, 1979

[30] Foreign Application Priority Data

Jul. 26, 1978 [CA] Canada ............................ 308157

[51] Int. Cl.$^3$ ............................................ C04B 11/14
[52] U.S. Cl. ................................... 106/111; 106/315
[58] Field of Search ....................... 106/109, 111, 315

[56] References Cited

U.S. PATENT DOCUMENTS

| | | | |
|---|---|---|---|
| 2,358,701 | 9/1944 | Gardner | 106/89 |
| 2,410,390 | 10/1946 | Paley | 106/109 |
| 2,820,714 | 1/1958 | Schneiter et al. | 106/110 |
| 3,284,227 | 11/1966 | Gerton | |
| 3,331,695 | 7/1967 | Angstadt | 106/89 |
| 3,369,915 | 2/1968 | Lee | 106/111 |
| 3,393,116 | 7/1968 | Larson | 161/43 |
| 3,577,248 | 5/1971 | Doan et al. | 106/111 |
| 3,725,090 | 4/1973 | Lyass et al. | 106/38.35 |
| 3,864,138 | 2/1975 | Uchikawa et al. | 106/89 |
| 3,947,285 | 3/1976 | Jones et al. | 106/111 |
| 3,957,522 | 5/1976 | Matsuo et al. | 106/109 |
| 4,019,920 | 4/1977 | Burkard et al. | 106/114 |
| 4,026,723 | 5/1977 | Grof et al. | 106/315 |
| 4,059,456 | 11/1977 | De Rooy et al. | 106/111 |
| 4,060,425 | 11/1977 | Harada et al. | 106/315 |
| 4,102,697 | 7/1978 | Fukuba et al. | 106/11 |
| 4,169,747 | 10/1979 | De Rooy et al. | 106/315 |
| 4,184,887 | 1/1980 | Lange et al. | 106/111 |

*Primary Examiner*—James Poer
*Attorney, Agent, or Firm*—Birch, Stewart, Kolasch & Birch

[57] ABSTRACT

A gypsum set accelerator for use in the production of gypsum wallboard comprises a tube or ball milled mixture of gypsum and up to 20 percent by weight of the gypsum of a synthetic water-soluble solid surfactant. A process for the manufacture of gypsum wallboard is also described comprising spreading between paper sheets an aqueous slurry of calcium sulphate hemihydrate defined above at a rate of between 0.5 and 15 kilograms per 100 square meters (1 and 30 pounds per 1000 square feet) of gypsum wallboard, and allowing the slurry to set. The accelerator has high potency and appears to provide wallboard of increased compressive strength.

18 Claims, No Drawings

4,298,394

ORGANIC GYPSUM SET ACCELERATORS

BACKGROUND OF THE INVENTION

1. Field of the Invention

This invention relates to the production of gypsum wallboard and a novel composition and method for improving the setting time and strength of the gypsum in the wallboard.

2. Description of the Prior Art

To manufacture gypsum wallboard an aqueous slurry of calcined gypsum (notably calcium sulphate hemihydrate) is continuously spread between upper and lower paper sheets. The continuous product thus formed is conveyed on a continuous moving belt until the slurry has set. The strip or sheet is then cut to form boards of prescribed length, after which they are then passed through an oven or kiln to be dried until the excess water in the gypsum board has evaporated. In the production of gypsum wallboard, it is customary to add various substances to the slurry for various purposes. For example, it is customary to lighten the weight of the calcined gypsum slurry by incorporating foaming agents to provide a degree of aeration which lowers the density of the final wallboard.

It is also customary to decrease the setting time of the calcined gypsum slurry by incorporating gypsum set accelerators. Calcium sulphate hemihydrate mixed with an appropriate amount of water will normally set in about 25 minutes to a hardness that enables wallboards made from such gypsum to be handled. In modern wallboard manufacturing plants, where a high production rate is necessary, 25 minutes is too long, and it has been customary to reduce the setting time of the aqueous slurry to about 5 to 8 minutes by incorporating a gypsum set accelerator. Freshly ground gypsum is a well-known gypsum set accelerator but has a relatively short shelf life, and various ways and means have been sought to improve the shelf life of the ground gypsum.

For example, U.S. Pat. No. 4,019,920 discloses a milled gypsum-starch composition, U.S. Pat. No. 4,059,456 describes a composition made up of finely ground calcium sulphate dihydrate and lignosulphonate, a waste product derived from the sulphite pulping of wood and Canadian Pat. No. 999,310 proposes a finely particulate intimate admixture of gypsum and a long chain fatty carboxylic acid containing at least 12 carbon atoms, or a salt thereof. Other publications propose the use of sugar or soluble dextrin as stabilising agents for ground gypsum to be used as a gypsum set accelerator, but these materials are expensive.

SUMMARY OF THE INVENTION

The present invention now provides ground gypsum set accelerators which unexpectedly have superior set accelerating properties as compared with freshly ground gypsum, and which incorporate additives some of which are known in gypsum wallboard manufacture although their usefulness in gypsum set accelerators has never been discovered.

According to the invention, a gypsum set accelerator for use in the production of gypsum wallboard comprises a mixture of milled gypsum, and up to 20 percent by weight of the gypsum, of of at least one synthetic solid water-soluble surfactant. The synthetic solid water-soluble surfactants, specifically, detergents may be anionic, non-ionic or cationic synthetic surfactants. Examples of the anionic group of surfactants include linear alkylate sulphonates such as sodium linear alkylbenzene sulphonates and sodium lauryl sulphates.

The non-ionic surfactant may be an ethoxylated nonylphenol.

The cationic surfactant may be any suitable solid cationic surfactant.

The accelerators according to the invention can be prepared by ball or tube milling gypsum and one or more of the aforementioned additives to produce a product having a high specific surface area to weight ratio. In general, it appears that the higher the specific surface to weight ratio, the more potent the accelerator in setting gypsum. The tube or ball milled gypsum set accelerator preferably has a specific surface area-to-weight ratio of at least 8,000 square centimeters per gram.

The invention also provides a process for the manufacture of gypsum wallboard in which there is added to the calcined gypsum slurry employed, at a rate of between 0.5 and 15 kilograms per 100 square meters (1 and 30 pounds per 1000 square feet) of gypsum wallboard, an accelerator comprising a milled composition comprising gypsum, and an effective set accelerating increasing amount up to 20 percent by weight of the gypsum, at least one synthetic solid water-soluble surfactant.

Examples of gypsum set accelerators according to the invention, as described below, were tested for potency and effectiveness after aging.

Each combination of gypsum and additive was evaluated for gypsum set accelerating potency in combination with gypsum plaster. Furthermore, since conventional ground gypsum accelerators progressively lose their effectiveness with time, the accelerator products were tested both in their freshly prepared condition and after aging for periods of time up to four weeks, to evaluate both their potency and their shelf life.

As examples of sodium alkylate sulphonates or sodium linear alkylbenzene sulphonates, there were used a solid flake surfactant product sold under the trade mark ULTRAWET DS (Arco Chemical Company, Philadelphia, Pa., U.S.A.) and a sodium salt of dodecyl benzene sulphonate sold under the trade mark NANSA HS 80/S (Erco Industries Ltd., Islington, Ontario, Canada).

As an example of a sodium lauryl sulphate there was used the sodium salt of sulphated medium-cut lauryl alcohol, as sold under the trade mark EMPICOL LZV (Marchon U.K.).

As an example of solid non-ionic surfactants, there was used a solid ethoxylated nonyl-phenol product sold under the trade mark ALKASURF NP-50 (Alkaril Chemicals Ltd., Mississauga, Ontario, Can.).

All these types of surfactant are readily available and have the advantage of being reasonably low in cost.

The test results of gypsum set accelerators according to the invention are set forth in Tables I to III.

The accelerators were prepared by ball milling gypsum and the various identified additives at levels up to 20% by weight of the gypsum in a laboratory size ball mill or in a production type ball mill to form a dry mixture.

The specific surface results obtained for the experimental ball milled products were as follows:

TABLE I

| Tube Milled Gypsum Containing | Specific Surface cm²/g |
|---|---|
| (a) 1% Empicol LZV | 10,421 |
| (b) 5% Empicol LZV | 11,500 |
| (c) 2% Ultrawet DS | 10,250 |
| (d) 10% Ultrawet DS | 11,332 |
| (e) 20% Ultrawet DS | 9,168 |
| (f) 1% Nansa HS80/S | 11,124 |
| (g) 2% Nansa HS80/S | 11,228 |
| (h) 10% Nansa HS80/S | 11,488 |
| (i) 2% Alkasurf NP-50 | 11,691 |

(a) First Test for Accelerating Potency—The setting time was determined for standard plaster of paris in the following manner. 200 g. plaster of paris were mixed in a high speed mixer with 0.5 g test accelerator, aged for the indicated time, in combination with 136 ml. water at 40.9° C. (120° F.). After high speed mixing for 15 sec., the resultant slurry was poured onto a glass plate and the setting time was determined according to the Vicat needle method, described in CSA A82.2OM 1977, Section 5.

TABLE II

| Sample | Vicat Setting Time, min. | | |
|---|---|---|---|
| | 0 days ageing | 4 days ageing | 15 days ageing |
| Plaster of Paris with no accelerator | 30 | 30 | 30 |
| Plaster + normal ground gypsum accelerator | 10.6 | 11.0 | 11.4 |
| Plaster + ball milled gypsum accelerator containing 1% Empicol LZV | 6.6 | 6.7 | 6.7 |
| Plaster + ball milled gypsum accelerator containing 5% Empicol LZV | 7.9 | 8.1 | 8.3 |
| Plaster + ball milled gypsum accelerator containing 2% Ultrawet DS | 6.2 | 6.2 | 6.3 |
| Plaster + ball milled gypsum accelerator containing 10% Ultrawet DS | 5.5 | 5.7 | 5.8 |
| Plaster + ball milled gypsum accelerator containing 20% Ultrawet DS | 5.6 | 6.8 | 6.9 |
| Plaster + ball milled gypsum accelerator containing 1% Nansa HS80/S | 4.8 | 4.9 | 5.1 |
| Plaster + ball milled gypsum accelerator containing 2% Nansa HS80/S | 4.2 | 4.8 | 4.9 |
| Plaster + ball milled gypsum accelerator containing 10% Nansa HS80/S | 5.5 | 5.6 | 5.6 |
| Plaster + ball milled gypsum accelerator containing 2% Alkasurf NP-50 | 5.0 | 5.6 | 5.8 |

(b) Second Test for Accelerating Potency—The novel accelerators were tested in a standard gypsum wallboard core formulation as follows:

| | per 100 square meters | per 100 square feet |
|---|---|---|
| Calcined gypsum | 736 kg | 1508 lb |
| Water of hydration | 69.4 kg | 142.2 lb |
| Paper pulp fiber | 5.9 kg | 12 lb |
| Foaming agent | 0.6 kg | 1.3 lb |
| Starch | 4.9 kg | 10 lb |
| Accelerator | 4.9 kg | 10 lb |
| Core total | 821.7 kg | 1683.5 lb |
| Front and back paper | 63.5 kg | 130 lb |
| Board weight | 885.2 kg | 1814 lb |

The results of this second test are set forth in Table III. The temperature rise setting time was determined in accordance with CSA A82.2OM 1977 Physical Testing of Gypsum Plasters, Section 5.3.

TABLE III

| Accelerator Type | Vicat Setting Time, minutes | Temperature Rise Setting Time, minutes |
|---|---|---|
| Normal ground gypsum | 9.5 | 12.3 |
| Gypsum + 1% Empicol LZV | 5.0 | 8.6 |
| Gypsum + 5% Empicol LZV | 6.5 | 9.3 |
| Gypsum + 2% Ultrawet DS | 4.6 | 7.3 |
| Gypsum + 10% Ultrawet DS | 4.0 | 6.8 |
| Gypsum + 20% Ultrawet DS | 5.6 | 7.0 |
| Gypsum + 1% Nansa HS80/S | 3.5 | 5.6 |
| Gypsum + 2% Nansa HS80/S | 3.1 | 5.3 |
| Gypsum + 10% Nansa HS80/S | 5.3 | 7.3 |
| Gypsum + 2% Alkasurf NP-50 | 3.1 | 6.6 |

Furthermore, it appears, from the results of tests using the gypsum set accelerators of this invention, that higher wallboard core strength is achieved using these ball-milled accelerators. For example, the compressive strength for a wallboard core produced with 4.9 kg/100m² (10 lb per 1000 square feet) of a gypsum+2% ULTRAWET DS ball-milled accelerator is 4709 kilopascals as compared with the compressive strength of a conventional gypsum wallboard core of 3558 kilopascals.

We claim:

1. A gypsum set accelerator for use in the production of gypsum wallboard comprising gypsum incorporating an effective set accelerating increasing amount up to 20 percent by weight of the gypsum of at least one synthetic solid water-soluble detergent.

2. An accelerator according to claim 1 wherein the detergent is a synthetic anionic detergent.

3. An accelerator according to claim 2 wherein the detergent is a solid sodium alkylate sulphonate or sodium lauryl sulphate.

4. An accelerator according to claim 3 wherein the detergent is a linear alkylbenzene sulphonate.

5. An accelerator according to claim 4 wherein the detergent is sodium linear alkylbenzene sulphonate.

6. An accelerator according to claim 5 wherein the detergent is a sodium salt of dodecyl benzene sulphonate.

7. An accelerator according to claim 1 wherein the detergent is a synthetic non-ionic detergent.

8. An accelerator according to claim 7 wherein the detergent is an ethoxylated nonyl-phenol.

9. An accelerator according to any of claims 1 to 8 having a specific surface area-to-weight ratio of at least 8000 square centimeters per gram 10. A method of making a gypsum set accelerator which comprises milling together gypsum and at least one solid water-soluble synthetic detergent in an effective set accelerating increasing amount up to 20 percent of the weight of the gypsum.

11. A process for the manufacture of gypsum wallboard which comprises spreading an aqueous slurry of calcium sulphate hemihydrate between two parallel continuous paper sheets and allowing the gypsum to set, wherein there is added to the hemihydrate at a rate of between 0.5 and 15 kilograms per 100 square meters of gypsum wallboard an accelerator comprising a milled composition of gypsum and an effective set accelerating increasing amount up to 20 percent by weight of the gypsum of at least one synthetic solid water-soluble detergent.

12. A process according to claim 11 wherein the detergent is a solid sodium linear alkylbenzene sulphonate, sodium lauryl sulphate or solid ethoxylated nonylphenol.

13. A gypsum set accelerator for use in the production of gypsum wallboard comprising a dry milled admixture of gypsum and an effective set accelerating increasing amount up to 20 percent by weight of the gypsum of at least one synthetic solid water-soluble detergent.

14. A gypsum set accelerator for use in the production of gypsum wallboard consisting essentially of a dry milled admixture of gypsum and an effective set accelerating increasing amount up to 20 percent by weight of the gypsum of at least one synthetic solid water-soluble detergent.

15. An accelerator according to claim 1, wherein said synthetic detergent is selected from the group consisting of anionic, non-ionic and cationic synthetic detergents.

16. An accelerator according to claim 13, wherein said synthetic detergent is selected from the group consisting of anionic, non-ionic and cationic synthetic detergents.

17. An accelerator according to claim 14, wherein said synthetic detergent is selected from the group consisting of anionic, non-ionic and cationic synthetic detergents.

18. An accelerator according to claim 15, wherein said accelerator is a milled admixture of said gypsum and said detergent.

* * * * *